United States Patent
Cai et al.

(10) Patent No.: US 6,680,279 B2
(45) Date of Patent: Jan. 20, 2004

(54) NANOSTRUCTURED CATALYST PARTICLE/CATALYST CARRIER PARTICLE SYSTEM

(75) Inventors: Mei Cai, Bloomfield Hills, MI (US); Lee Lizhong Feng, Troy, MI (US); Martin S. Ruthkosky, Sterling Heights, MI (US); Jerry Dale Rogers, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/056,381

(22) Filed: Jan. 24, 2002

(65) Prior Publication Data

US 2003/0139288 A1 Jul. 24, 2003

(51) Int. Cl.⁷ .......................... B01J 23/40; B01J 23/42; B01J 23/60; B01J 23/72; B01J 23/44

(52) U.S. Cl. ................. 502/327; 502/329; 502/331; 502/332; 502/333; 502/334; 502/339; 502/342; 502/346; 502/355; 502/415; 502/439; 502/303; 502/304

(58) Field of Search .................. 502/304, 303, 502/327, 329, 331, 332, 333, 334, 339, 342, 343, 346, 355, 415, 439

(56) References Cited

U.S. PATENT DOCUMENTS

| | | | | |
|---|---|---|---|---|
| 3,925,259 A | * | 12/1975 | Kane ........................... | 252/470 |
| 4,261,862 A | * | 4/1981 | Kinoshita et al. ............ | 252/462 |
| 4,274,981 A | * | 6/1981 | Suzuki et al. ................ | 252/438 |
| 4,587,230 A | * | 5/1986 | Cavaterra et al. ........... | 502/225 |
| 4,678,770 A | * | 7/1987 | Wan et al. ................... | 502/304 |
| 4,701,436 A | * | 10/1987 | Wang et al. ................ | 502/339 |
| 4,757,045 A | * | 7/1988 | Turner et al. ............... | 502/252 |
| 4,904,633 A | * | 2/1990 | Ohata et al. ................ | 502/304 |
| 4,915,987 A | | 4/1990 | Nara et al. | |
| 5,019,546 A | | 5/1991 | Murakami et al. | |
| 5,326,735 A | * | 7/1994 | Itoh et al. ................... | 502/177 |
| 5,373,999 A | | 12/1994 | Miyanami | |
| 5,462,907 A | * | 10/1995 | Farrauto et al. ............ | 502/304 |
| 5,496,788 A | * | 3/1996 | Domesle et al. ............ | 502/333 |
| 5,750,458 A | * | 5/1998 | Kennelly et al. ........... | 502/304 |
| 5,958,829 A | * | 9/1999 | Domesle et al. ............ | 502/333 |
| 6,045,764 A | * | 4/2000 | Iizuka et al. ............. | 423/213.5 |
| 6,362,121 B1 | * | 3/2002 | Chopin et al. ................ | 502/2 |
| 6,395,675 B1 | * | 5/2002 | Suga et al. ................. | 502/326 |

OTHER PUBLICATIONS

Product Brochure, NARA Machinery Co., Ltd., "Hybridization System—Powder Surface Modification Technology".
Product Brochure, Tokuju Corporation, "Theta Composer", Nov. 1995.

* cited by examiner

*Primary Examiner*—Cam N. Nguyen
(74) *Attorney, Agent, or Firm*—Kathryn A. Marra

(57) ABSTRACT

A method of dispersing nanosized catalyst particles on the surface of larger catalyst carrier particles is disclosed. The coating process is done dry and yields high effective surface area of nanosized catalyst particles coated on the surface of catalyst carrier particles. In this process, nanosized catalyst particles and catalyst carriers are mechanically mixed in a high velocity and impact force environment to which catalyst particles are embedded, or filmed, on the surface of catalyst carrier particles without using water or any other additional chemicals. The catalyst composite structure produced comprises better coating uniformity of the catalyst particle on its catalyst carrier. The catalyst particle/catalyst carrier composite produced can be applied to a support structure, such as a monolith as readily used in automotive or other applications.

10 Claims, 1 Drawing Sheet

NANOSTRUCTURED CATALYST PARTICLE/CATALYST CARRIER PARTICLE SYSTEM

TECHNICAL FIELD

This invention relates to a method of making a catalyst in which small catalyst particles are dispersed on the surface of larger catalyst carrier particles. More specifically, it relates to using a dry-coating process to coat nanometer-sized catalyst particles on the surface of larger catalyst carrier particles. The dry-coated catalyst particle/carrier particle composite mixture is then adapted for a catalyst application, such as automotive exhaust gas treatment or for a fuel cell reformer.

BACKGROUND OF THE INVENTION

Catalysts are used in many different applications. Their compositions and structures vary, as do the processes by which they are prepared. In applications where the catalyst used is present as a separate phase from the reacting chemical species that it contacts, i.e., heterogeneous catalysis, a method must be employed to support the catalytic entity in the presence of the reacting phase. Automotive exhaust treatment catalysts are an example of heterogeneous catalysts, and the background for this invention will be illustrated in that context.

Automotive vehicles have used catalytic converters to treat unburned hydrocarbons, carbon monoxide and various nitrogen oxides produced from the combustion of hydrocarbon fuels in the engine. The engine exhaust gases flow through a catalytic converter that contains a very small amount, e.g., an ounce, of noble metals, such as palladium, platinum and rhodium. The catalytic converter comprises a stainless steel can that houses an extruded ceramic body, such as cordierite composition, in the shape of an oval honeycomb, generally referred to as a monolith. The extruded body contains several hundred small longitudinal passages per square inch of its cross-section. The engine exhaust passes through these channels, contacts the catalyst coated thereon, and the hazardous constituents are oxidized and/or reduced.

The catalyst combination coated on the walls of the monolith passages, or channels, comprises particles of activated alumina, or the like, which carry much smaller and dispersed particles of the noble metals. A challenge in preparing such exhaust treatment catalysts lies in making maximum use of the relatively expensive noble metal. The noble metal must be distributed so that all of it, or nearly all of it, is exposed to contact the exhaust gas. Thus, catalyst particles are distributed on carrier particles and this combination supported on the walls of the monolith for contacting the exhaust gas.

In accordance with present practice, an aqueous slurry of activated alumina is first applied as a thin film on the walls of the monolith passages. Activated alumina is a material that is processed to have a very large surface area per unit mass/volume. To enhance its catalyst carrier properties, the alumina may contain small amounts of other metal oxides, such as cerium oxide and lanthanum oxide. The aqueous slurry of finely divided carrier particles is drawn through the channels of the monolith and the excess drained off. The coated monolith is dried, and the coating calcined. A thin layer of alumina catalyst carrier particles is thus fixed to the walls of the channel.

The noble metal(s) to be coated on the alumina is prepared as a water-based solution of suitable salts. This solution is used to soak and impregnate the alumina coating, thus permitting the noble metal compounds to infiltrate the irregular surface of the alumina particles that provides its remarkably large area. Residual solution, containing the noble metal, if any is removed. This impregnation of the alumina with a noble metal solution is referred to as a wet process. The noble metal/alumina coating on the walls of the monolith passages is known as a wash coat of the catalyst.

Exhaust catalysts prepared in this way have worked well for many years. However, losses and inefficiencies remain from using this wet processing. Moreover, if possible, there is a great need to disperse the expensive metal even further so that smaller quantities can be used and/or even more complete elimination of undesirable exhaust products can be obtained.

SUMMARY OF THE INVENTION

This invention uses nanometer-sized particles of catalytic noble metals, such as platinum, and certain metal oxides, such as copper oxide and zinc oxide. These metals and metal oxides are commercially available in batch quantities in size ranges of, for example, 5–50 nanometers. Since such particles are usually somewhat irregular in shape, "size" means the "diameter" of a particle or like or equivalent characteristic linear dimension. In general, catalyst particle lots where the particle size distribution is within the size range of about 1 to 500 nanometers are suitable for use in the practice of this invention. A special feature of this invention is a process of dispersing, or coating, such small catalytic particles on the surfaces of larger catalyst carrier particles. The preferred carrier particles include, but are not limited to; high surface area alumina particles and alumina that incorporates metal oxides, such as cerium and lanthanum.

The coating process of this invention yields high effective surface area of catalyst particles on the catalyst carrier particles. In the process, the catalyst particles and catalyst carrier particles are mechanically mixed under conditions under which they impact each other and most of the catalyst particles surprisingly end up adhering to the surface of the larger carrier particles. The process works most favorably when the carrier particles are substantially larger than the catalyst particles. Preferably, the median diameter, or other characteristic dimension, of the carrier particles is at least ten times the median diameter of the catalyst particles to obtain the catalyst particle-on-carrier particle composite material. The median particle diameter is suitably determined by the dynamic light scattering particle size measurement method. While given batches of both catalyst and carrier particles will have ranges of dimensions, it is preferred that there be suitably large carrier particles in the mix for each catalyst particle. However, as illustrated in Example 2 below, smaller (less than 10× catalyst particle size) carrier particles can be used to make the composite material when they are first coated on a larger support material such as micrometer sized ceramic fibers.

The coating process is a dry process. It does not require the use of water or any other constituent to accomplish the coating of the catalyst particles on their carrier particles. Often the nanometer sized catalyst particles are initially present in clusters or agglomerates. The suitable dry mixing processes break up these agglomerates and disperse the catalyst particles on the carrier particles. The resulting catalyst particle/catalyst carrier combination evidences uniform and well-dispersed catalyst particles on the carrier particles.

The catalyst particle/carrier particle composite, thus produced, is in the form of a powder. In many applications, application of this powder to a suitable support structure will be necessary. For example, the composite powder could be slip coated on the walls of the channels of a corderite monolith for the treatment of automotive exhaust gas. In other applications, the composite powder could be coated on ceramic fibers, carbon fibers, or other kinds of catalyst support structures. For these applications, the carrier particles could be coated on the support bodies and the catalyst particles later coated on the carrier particles.

Regardless of the support means for the composite catalyst/carrier particles, this invention provides a simple and dry coating process by which nanometer-sized catalyst particles are dispersed on the surfaces of larger catalyst carrier particles in a form in which the catalyst surfaces can be effectively utilized. In essence, suitable quantities of catalyst particles and carrier particles are incorporated in the mixer and the mixed product is useful as is without recycling or purification.

Other objects and advantages of this invention will become apparent from a detailed description of specific embodiments that follow.

BRIEF DESCRIPTION OF THE DRAWINGS

FIG. 1 includes a 10 micrometers scale line.

FIG. 2 includes a 100 nanometers scale line and shows alumina particles on the surface of the ceramic fiber with platinum particles coated on the alumina particles.

DESCRIPTION OF PREFERRED EMBODIMENTS

Figure 1:
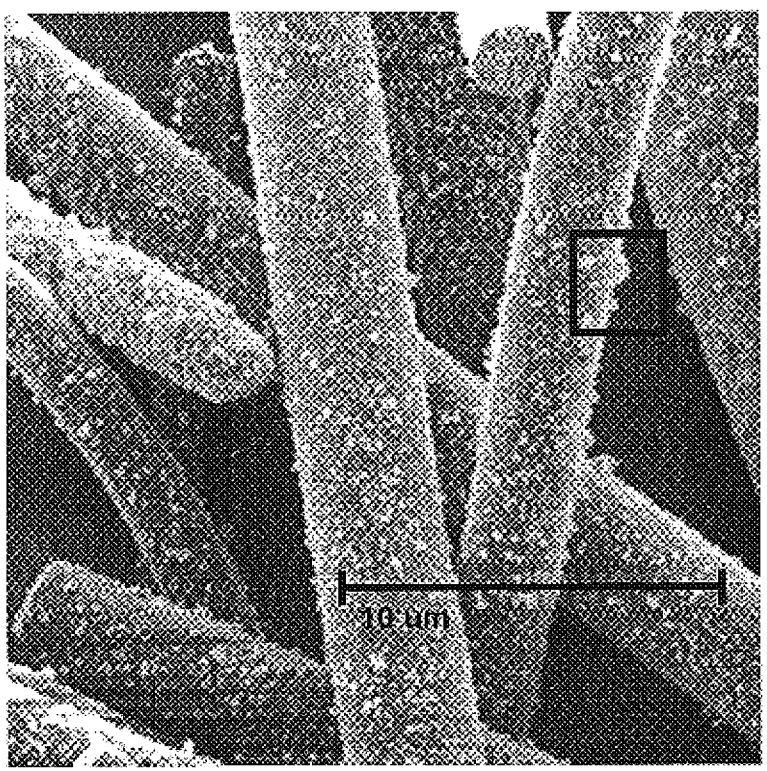
FIG. 1 is a scanning electron microscope photomicrograph of ceramic fibers dry coated with alumina particles and then platinum particles in accordance with example 2A of this specification.

The desired catalyst structure comprises nanometer-sized catalyst particles uniformly dispersed, or coated, on the surface of larger catalyst carrier particles. Suitably, the size of the catalyst particles is less than approximately five hundred nanometers in the largest dimension. For example, limited quantities of commercially available particles of platinum and other noble metals, as well as copper oxide and zinc oxide particles, can be obtained in the 5–50 nanometer size range. These materials comprise a relatively low number of atoms or oxide molecules per particle and offer an efficient use of these catalytic substances provided they can be dispersed on larger carrier particles. The catalyst carrier particles will generally be of micrometer scale size although alumina particles in the fifty to one hundred nanometers size range have been used in the practice of this invention after being dry coated on micron sized ceramic fibers.

Catalyst particles for use in the present invention include the various noble metals, specifically those selected from the group consisting of platinum, palladium, rhodium, or mixtures thereof. These metals are well known as oxidation catalysts and catalysts for other purposes. Metallic oxides, e.g. copper oxide or zinc oxide, have demonstrated utility as catalysts and can also be used in the practice of this invention. In fact virtually any solid material available as small particles and displaying desirable catalytic activity can be employed. In order to achieve proper, uniform coating the ratio of the median diameters, as determined by dynamic light scattering, of the carrier particles to catalyst particles is ten or greater. In the present invention, nanometer sized catalyst particles were used. The catalyst particles were initially physically present in the form of agglomerates and were dispersed as nanometer scale particles on the surface of the carrier particles during processing.

Suitable catalyst carrier particles for use in this invention have a large surface area for dispersion of the catalyst particles. They must be chemically compatible with the catalyst in the intended reactive environment and they must display strength and stability for the application. Gamma alumina, or other suitable forms of aluminum oxide, $Al_2O_3$, is often used as the catalyst carrier because it can be readily produced as a strong small particle with very high specific surface area. Sometimes small amounts of cerium oxide (i.e. ceria) and/or lanthanum oxide (i.e. lanthana) are mixed with alumina to enhance its oxygen storage capacity or other desirable carrier properties.

A dry mixing and coating process is used to coat the nanometer-sized catalyst particles onto the larger carrier particles. In general, the coating process blends premeasured portions of catalyst particles and carrier particles and then subjects them to high impact forces for a time suitable to coat and disperse the smaller catalyst particles on the surface of the carrier particles. Two different commercially available machines have been found to accomplish this coating operation. One machine is the Hybridizer produced in various sizes by the Nara Machinery Company of Tokyo, Japan. A second suitable mixing machine is the Theta Composer produced by Tokuju Corporation, also of Tokyo, Japan.

Figure 2:
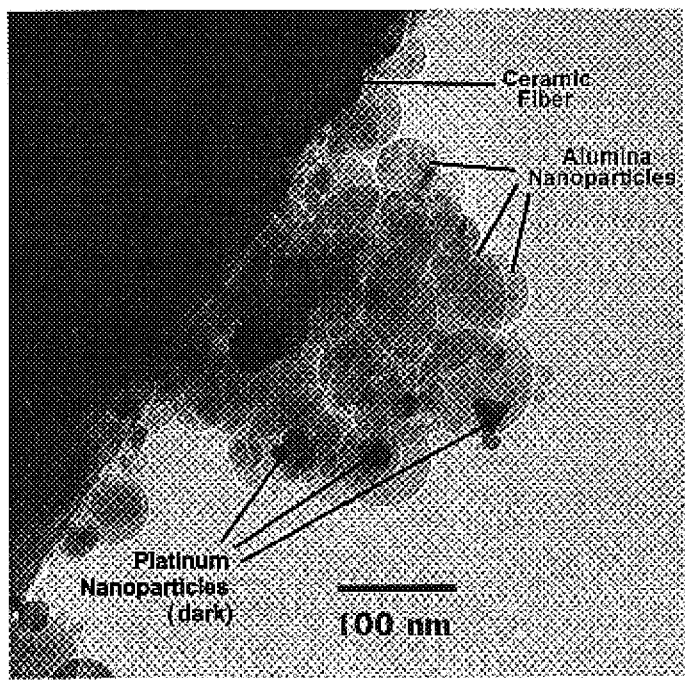
FIG. 2 is a transmission electron microscope photomicrograph of the blocked region indicated on FIG. 1.

The Hybridizer mixing machine used in the examples described below in this specification appears to be described in U.S. Pat. No. 4,915,987. FIGS. 2–4 illustrate the operation of this mixing device and, accordingly, the disclosure of that patent is hereby incorporated by reference into this specification for a more complete description of mixing processes it performs. In summary and as seen, for example, in FIG. 2 the mixer comprises a vertically oriented, rotatable circular plate supported in a mixing chamber. The plate has several radially aligned impact pins attached to its perimeter and can be driven at a range of speeds up to 15,000 rpm. The plate rotates within a collision ring having an irregular or uneven surface facing the impact pins.

A powder comprising premixed catalyst particles and catalyst carriers are fed into a hopper leading to the powder inlet at the rotational axis of the machine. Air or other suitable atmosphere is used during the mixing. The incoming powder mixture is carried in the air stream by centrifugal force to the edge of the rotor plate. The powder particles receive a momentary strike by many pins or blades on the rotor and are thrown against the collision ring. The airflow generated by the fan effect of the rotating plate and pins causes repeated impacts between the catalyst particles and carrier particles and the collision ring. The design of the Hybridizer machine permits selective withdrawal of the mixed powder along with recycling of some powder and continuation of the mixing. In accordance with this invention, the product produced by this dry coating process is a mixture in which the nanometer-sized catalyst particles are coated on the surfaces of the carrier particles.

Dry coating in accordance with this invention has also been accomplished using a Theta Composer. The operation of this machine appears to be illustrated in U.S. Pat. No. 5,373,999 and the disclosure of that patent is hereby incorporated into this specification by reference.

As seen in FIGS. 1, 2, 3(a) and 3(b) of the '999 patent, the Theta Composer comprises a horizontally disposed, rotary cylindrical tank with an oval cross section mixing chamber.

Supported within the oval mixing chamber is a smaller oval mixing blade that is rotatable separately from the tank in the same or opposite direction. The long axis of the mixing blade is slightly smaller than the short axis of the oval chamber to effect a gathering and compression of particles caught between them in the operation of the machine. The outer vessel rotates relatively slowly to blend the particles while the inner rotor rotates at relatively high speed. The catalyst and carrier particles drop freely by gravitation in the moving large volume swept by the mixing blade and fluidize along the inner wall of the mixing chamber. Particles that are wedged in the moving narrow clearance between the inner wall of the oval cross-section and the mixing blade are suddenly subjected to strong shearing forces. This action is found to coat and embed the catalyst particles on the surface of the larger particles to form a catalyst/carrier composite.

The practice of the invention will now be illustrated by some specific examples.

EXAMPLE 1

Dry Coating Method

Platinum nanoparticles (Nanophase Technologies) were added to aluminum oxide (alumina) particles (Condea Corporation) to achieve a platinum composition equal to 0.4% of the total sample weight. The particles were blended in a conventional laboratory mixer at 1000 rpm for two minutes. The alumina particles had a median particle size of three microns and a specific surface area of 150 $m^2$/g. The platinum particles were obtained in a particle diameter size range of 10–40 nanometers and specific surface area of 12 $m^2$/g. At this stage, the blended mixture consisted simply of a relatively low number of platinum particle agglomerates interspersed with alumina particles having diameters on average about 100× the size of the platinum particles.

This large particle/small particle mixture was then transferred into the chamber of a laboratory Hybridizer mixing machine and processed for 12 minutes at a blade rotation speed of 8000 rpm. The resulting mixture is identified as Sample 1A.

The Sample 1A powder was compressed into pellets that, while porous, had sufficient mechanical strength for handling. The compaction was accomplished using a 0.52 inch diameter stainless steel die in a hydraulic press. A force of three tons was applied to the powder. The apparent void volume of the porous pellet was about 65% of the densities of its constituents.

The pellets were then placed in a Micromeritics AutoChem 2910 instrument for determination of the catalyst metal surface area per unit loading. The pellets were initially treated with 10% hydrogen in argon at 120° C. for 30 minutes to remove the residual water followed by chemical reduction to platinum metal at 350° C. for 4 hours. The pulsed chemisorption with 10% carbon monoxide in helium was conducted on sample 1A material following the sample reduction.

Comparison Sample

A comparison sample, Sample 1B, was prepared using a conventional wet coating method. Platinum particles (Nanophase Technologies) were added to alumina particles (Condea Corporation) to achieve a platinum composition equal to 0.9% of the total (dry) sample weight. More than twice as much platinum was used in this comparison experiment. This dry mixture was then slurried in de-ionized water to form a suspension. The solid content of the wet mixture was approximately 45% by weight. The suspension was stirred for several minutes to distribute the small platinum particles on the much larger alumina particles. The mixture was slowly dried so as not to disturb any coated particles. The dried mixture was then calcined in a crucible in air at 400° C. for 1 hour.

The above dried and calcined mixture was then compressed into pellets by the same pressing device as was done with the sample 1A material. The same apparent density was achieved and the porous pellets were strong enough for handling.

The pellets were initially treated with 10% hydrogen in argon at 120° C. for 30 minutes to remove the residual water followed by chemical reduction to platinum metal at 350° C. for 4 hours. The pulsed chemisorption with 10% carbon monoxide in helium was conducted on the sample 1B comparison material following the sample reduction.

Example 1 Results

Following sample reduction and cooling, the active surface area of the platinum particles on Sample 1A was determined by pulse chemisorption using 10% carbon monoxide in helium. It is, of course, known that platinum chemically adsorbs carbon monoxide, and this practice is recognized as a suitable method of measuring the active surface area of platinum dispersed on alumina.

The active platinum surface area as measured was about 17.8 square meters per gram of platinum in the sample, and about 0.07 square meters per gram of sample.

The sample 1A powder and the pellets were further examined by scanning electron microscope (SEM) surface analysis, energy dispersion spectrometer surface analysis and X-ray diffraction. All analyses showed, or were consistent with, the conclusion that the dry mixing in the Hybridizer machine had resulted in the platinum particles being substantially completely coated on the much larger alumina particles.

For the catalyst prepared using the conventional, wet process (i.e. Sample 1B), the active platinum surface area as measured was only about 3.7 square meters per gram of platinum in the sample, and only about 0.03 square meters per gram of sample (despite the higher platinum content). Thus, catalyst preparation using the dry mixing process provides a better surface coating and higher surface area of noble metal on the surface of the catalyst carrier as compared to that obtained using the conventional, wet process.

EXAMPLE 2

Dry Coating Method

Sample 2A was prepared by first combining alumina nanoparticles (Nanophase Technologies) with ceramic fibers to achieve a nanoparticle composition equal to 3% of the total weight. The alumina particles were generally spherical in shape with diameters in the range of 50–150 nanometers. The particles had a BET specific surface area of 37 $m^2$/g. The ceramic fibers had average diameters of 2–3 microns with an average length of about 150 microns. The ceramic fibers are viewed as support materials, not catalyst carriers. But in this example the combination of the nanometer sized alumina particle with the micron sized ceramic fibers enable the smaller platinum particles to be dispersed on the alumina particles.

The alumina particles were coated on the ceramic fibers using a laboratory scale Theta Composer. The outer oval cross-section vessel was rotated at 75 rpm and the oval blade was rotated at 2500 rpm. This mixing and coating operation was continued for 30 minutes. The mixture was examined after this mixing and coating step and it was observed that the alumina particles were adhered to and dispersed on the surfaces of the ceramic fibers.

Platinum particles (Nanophase Technologies) were then added to the coated fiber sample to achieve a platinum composition equal to 0.8% of the total sample weight. The platinum particle size range was 10–40 nanometers with a specific surface area of 12 $m^2/g$. In this example, the alumina particles did not have a median diameter that was ten times the median diameter of the platinum particles. However, alumina particles were coated on the much larger ceramic fibers and this facilitated dry coating of the platinum particles on the alumina particles. The mixing and coating process was repeated using the operating speeds and mixing time stated above.

A portion of the above mixture was then compressed into porous pellets using the tool described in Example 1. Again, the pellets were strong enough for handling and had a void volume of 54%.

The pellets were then placed in the Micromeritics AutoChem 2910 instrument for determination of the catalyst metal surface area per unit loading. The pellets were initially dried to remove residual moisture and then calcined at 400° C. for one hour. Following calcination, the pellets were treated with 10% hydrogen in argon at 120° C. for thirty minutes and then heated at 350° C. for four hours in the same atmosphere to chemically reduce the platinum metal particles. The pulsed chemisorption with 10% carbon monoxide in helium was conducted on the sample following sample reduction.

Comparison Sample

A comparison sample 2B was prepared by mixing platinum nanoparticles, alumina nanoparticles and ceramic fibers. The platinum and alumina nanoparticles comprised 1% and 5% of the total sample weight respectively. The respective materials were the same as those used in Example 2A. The dry mixture was slurried in deionized water and agitated sonically to enhance the mixing of the different sized particles and fibers, resulting in a more homogeneous suspension. The solid content of the mixture was about 45% by weight. The mixture was then slowly dried and calcined in air in a crucible at 400° C. for 1 hour.

The above dried and calcined mixture was compressed into porous pellets by the method described above. These Sample 2B pellets also had a void volume of 54%.

The Sample 2B pellets were dried with 10% hydrogen in argon at 120° C. for 30 minutes followed by reduction at 350° C. for 4 hours. The pulsed chemisorption with 10% carbon monoxide in helium was conducted following the sample reduction.

Example 2 Results

FIG. 1 is a scanning electron microscope photograph of the several alumina and platinum coated ceramic fibers. The fibers were not fully coated with alumina particles but the alumina is seen distributed on the two to three micron diameter fibers. The platinum particles can not be distinguished from the alumina particles at the magnification of this photograph. However, FIG. 2 is a transmission electron microscope photograph of the region □indicated in FIG. 1. In FIG. 2, the platinum nanoparticles (dark) are seen distributed on the alumina carrier particles.

Following sample reduction and cooling, the surface area of the platinum particles for both Sample 2A and the comparative sample 2B was determined by pulse chemisorption of 10% carbon monoxide in helium. Again, the observation that platinum adsorbs carbon monoxide validates this practice as a suitable method of measuring the active surface area of platinum dispersed on alumina particles and fibers.

The active platinum surface area as measured on Sample 2A was about 9.3 square meters per gram of platinum in the sample, and about 0.07 square meters per gram of sample.

The sample 2A powder and the pellets were further examined by scanning electron microscope surface analysis, energy dispersion spectrometer surface analysis and X-ray diffraction. All analyses showed, or were consistent with, the conclusion that the dry mixing in the Theta Composer machine had resulted in the platinum particles being substantially completely coated on the much larger alumina particles that in turn were coated on the larger alumina fibers.

The catalyst prepared using the conventional, wet process (i.e. Sample 2B), the active platinum surface area as measured was only about 7.2 square meters per gram of platinum in the sample, and only about 0.07 square meters per gram of sample. Thus, catalyst preparation using the dry coating process provides a better surface coating and higher surface area of noble metal on the surface of the catalyst carrier as compared to that obtained using the conventional, wet process.

EXAMPLE 3

Dry Coating Method

Sample 3A was prepared by initially blending alumina nanoparticles (Nanophase Technologies) with ceramic fibers (Zircar Ceramics) using a laboratory mixer at 1000 rpm for 2 minutes. The alumina particles comprised 6.5% of the total weight. The alumina nanoparticles had a nominal particle size range of 50–150 nanometers and a specific surface area of 37 $m^2/g$. The ceramic fibers had an average diameter of 2–3 microns and an average length of about 150 microns. The alumina particle/ceramic fiber mixture was then transferred into the chamber of the Hybridizer and processed for 3 minutes using a blade rotation speed of 8000 rpm, thus coating the alumina particles onto the ceramic fibers creating a first layer. In the second coating step, copper oxide nanoparticles (Nanophase Technologies) were then added to the above mixture to achieve a copper oxide composition equal to 5.5% of the total sample weight. The copper oxide nanoparticles had a median diameter of 23 nanometers and a specific surface area of 38 $m^2/g$. The components were processed under the same operating conditions, thus coating the copper oxide nanoparticles onto the surface of the above mixture creating a second layer. Again, the relatively small alumina particles were first coated on micrometer sized ceramic fibers. This enabled the copper oxide particles to be coated on the alumina particles.

The above mixture was then compressed into a pellet structure, with a pellet void volume of 48%, using a 0.52-inch diameter stainless steel die and a hydraulic press to apply 3-tons of force.

The pellets formed were placed in the Micromeritics AutoChem 2910 to determine the active metal surface area per unit loading. The pellets were initially dried with argon, first at 110° C. for 30 minutes and then at 400° C. for another 30 minutes. Reduction of the sample was conducted at 220° C. for 4 hours with 10% hydrogen in argon. The pulse chemisorption with 10% $N_2O$ in helium was conducted following the sample reduction.

Comparison Sample

A comparison sample, Sample 3B, was prepared by copper oxide nanoparticles, alumina nanoparticles and ceramic fibers with deionized water to form a suspension. The copper oxide and alumina particles comprised 5.5% and 5.5% of the total sample weight respectively. The respective materials were the same as those used in Example 3. The mixture was agitated sonically to enhance the mixing of the different sized particles and fibers, resulting in a more homogeneous suspension. The solid content of the mixture was maintained within a range of 40% to 55% by weight. The mixture was slowly dried and calcined in air in a crucible at 400° C. for 1 hour.

The above dried and calcined mixture was compressed into porous pellets by the method described above. These Sample 3B pellets had a void volume of 48% as well.

The Sample 3B pellets were initially dried with argon, first at 110° C. for 30 minutes and then at 400° C. followed by chemical reduction of the copper oxide at 350° C. for 4 hours. The pulse chemisorption with 10% $N_2O$ in helium was conducted following the sample reduction.

Sample 3 Results

Following sample reduction and cooling, the surface area of the copper oxide particles for Sample 3A was determined by pulse chemisorption of 10% $N_2O$ in helium. Again, the observation that the $N_2O$ reacts with the copper particles, formed from the reduction of copper oxide, validates this practice as a suitable method of measuring the surface area of copper dispersed on alumina particles and fibers.

The active copper surface area as measured on Sample 3A was about 7.1 square meters per gram of copper in the sample, and about 0.31 square meters per gram of sample.

The sample 3A powder and the pellets were further examined by scanning electron microscope surface analysis, energy dispersion spectrometer surface analysis and X-ray diffraction. All analyses showed, or were consistent with, the conclusion that the dry mixing in the Theta Composer machine had resulted in the copper oxide particles being substantially completely coated on the somewhat larger alumina particles that in turn were coated on the larger alumina fibers.

The catalyst prepared using the conventional, wet process (i.e. Sample 3B), the active copper surface area as measured was only about 1.3 square meters per gram of platinum in the sample, and only about 0.07 square meters per gram of sample. Thus, catalyst preparation using the dry coating process provides a better surface coating of the base metal oxide on the surface of the catalyst carrier as compared to that obtained using the conventional, wet process.

The previous examples demonstrate how the catalyst particle/catalyst carrier composite can be applied onto support materials such as ceramic fibers. Other suitable support materials that can be employed that are similar to that of ceramic fibers are carbon based nanotubes, carbon fibers, ceramic powders, alumina fibers, or the like. These support materials are advantageous in that dry mixing can be used to coat the composite (catalyst and carrier particles) on the surface of the support material and thus, better surface area coating of the composite on the support material can be achieved.

In automotive applications, the catalyst structure will typically be housed in a stainless steel can, known as a catalytic converter. The catalyst support material used is usually an extruded ceramic body, such as a corderite body, in the shape of an oval honeycomb, and is generally referred to as a monolith. The catalyst composite layer is typically applied to the surfaces of the monolith and the catalyst structure comprising the monolith support and its composite catalyst layer is placed inside the stainless steel can.

The corderite monolith support structure generally has a very complex geometry. The support resembles a honeycomb structure that comprises several small channels, or pores. The catalyst composite material is coated on the walls of these channels and thus, the most desirable coating method used is one in which the composite particles will have access to the channel wall surface. Therefore, the conventional slip coating is the most advantageous way of properly coating the channels of a monolith support structure with the dry coated catalyst composite.

While this invention has been described through application and through the examples described above, it is not intended to be limited to the above description, but rather only to the extent set forth in the following claims.

What is claimed is:

1. A process of making a composite of catalyst particles and catalyst carrier particles comprising:

dry coating catalyst particles with catalyst carrier particles such that the catalyst particles adhere to the surfaces of the catalyst carrier particles to form a composite catalyst particle/catalyst carrier particle material, said catalyst particles having diameters in the range of 1–500 nanometers, as dispersed on the carrier particles surface, and wherein said catalyst carrier particles either (a) having a median diameter that is at least ten times the median diameter of said catalyst particles, or (b) they are deposited on particles or fibers having a median diameter that is at least ten times the median diameter of said catalyst particles.

2. A process as recited in claim 1, wherein said catalyst particles comprise one or more noble metals and/or one or more metal oxides selected from the group consisting of copper oxide and zinc oxide.

3. A process as recited in claim 1, wherein said catalyst carrier particles comprise one or more oxides selected from the group consisting of aluminum oxide, cerium oxide, and lanthanum oxide.

4. A process as recited in claim 3, wherein said catalyst carrier particles are initially alumina particles having a surface area of at least 30 $m^2/g$.

5. A process as recited in claim 1, wherein said catalyst particles and catalyst carrier particles are applied dry to a larger support fiber.

6. A process as recited in claim 1, wherein said catalyst particles are dry-coated to the surface of said catalyst carrier particles by repeatedly propelling a mixture of said particles at high velocity against an impact surface.

7. A process as recited in claim 1, wherein said catalyst particles are dry-coated to the surface of said catalyst carrier particles by continually shearing a mixture of said catalyst particles and said catalyst carrier particles between rotating surfaces.

8. A catalyst composite comprising catalyst particles having diameters in the range of 1–500 nanometers dry coated on the surface of larger catalyst carrier particles.

9. The catalyst composite as recited in claim 8, wherein said catalyst particles comprise one or more noble metals and/or one or more metal oxides selected from the group consisting of copper oxide and zinc oxide.

10. The catalyst composite as recited in claim 8, wherein said catalyst carrier comprises one or more oxides selected from the group consisting of aluminum oxide, cerium oxide, and lanthanum oxide.

* * * * *